United States Patent
Sugiyama (10) Patent No.: US 9,889,706 B2
(45) Date of Patent: Feb. 13, 2018

(54) PNEUMATIC TIRE WITH RECTANGLE-SHEET-SHAPED CARCASS PLY PIECES

(71) Applicant: SUMITOMO RUBBER INDUSTRIES LTD., Kobe-shi, Hyogo (JP)

(72) Inventor: Naoki Sugiyama, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 606 days.

(21) Appl. No.: 14/377,206

(22) PCT Filed: Nov. 22, 2012

(86) PCT No.: PCT/JP2012/080379
§ 371 (c)(1),
(2) Date: Aug. 7, 2014

(87) PCT Pub. No.: WO2013/125117
PCT Pub. Date: Aug. 29, 2013

(65) Prior Publication Data
US 2015/0328929 A1 Nov. 19, 2015

(30) Foreign Application Priority Data
Feb. 22, 2012 (JP) .................. 2012-036647

(51) Int. Cl.
*B60C 9/04* (2006.01)
*B60C 9/02* (2006.01)
*B60C 5/00* (2006.01)
*B29D 30/42* (2006.01)
*B29D 30/38* (2006.01)

(52) U.S. Cl.
CPC .............. *B60C 9/04* (2013.01); *B60C 5/00* (2013.01); *B60C 9/023* (2013.01); *B29D 30/38* (2013.01);
(Continued)

(58) Field of Classification Search
CPC ............ B60C 9/023; B60C 2009/0408; B60C 2009/0441; B60C 9/02; B60C 9/04;
(Continued)

(56) References Cited

U.S. PATENT DOCUMENTS 4,261,393 A * 4/1981 Saito ........................ 156/134 X
5,098,768 A * 3/1992 Holroyd
(Continued)

FOREIGN PATENT DOCUMENTS

DE 3740827 A1 6/1989
EP 1072395 A1 1/2001
(Continued)

OTHER PUBLICATIONS

Mechanics of Pneumatic Tires, ed. Samuel Clark, US Department of Transportation, Aug. 1981, p. 204.*
English machine translation of JP 2001-294014 A, Oct. 23, 2001.*
English machine translation of JP 5-246207 A, Sep. 24, 1993.*
English machine translation of JP 2005-153349 A, Jun. 16, 2005.*
Extended European Search Report for European Application No. 12869553.3, dated Sep. 24, 2015.

*Primary Examiner* — Adrienne C Johnstone (74) *Attorney, Agent, or Firm* — Birch, Stewart, Kolasch & Birch, LLP (57) ABSTRACT

A pneumatic tire is provided with a carcass configured from at least one carcass ply. The carcass ply is formed by arranging, in the tire circumferential direction, rectangular sheet-shaped ply pieces, each having a radial direction length larger than a tire circumferential direction length. In each of the ply pieces, carcass cords are arranged parallel to each other in the longitudinal direction, and adjacent ply pieces at least partially overlap with each other in the tire circumferential direction, and in each of the ply pieces, the distance (Pe) between the carcass cords in at least one side edge portion in the circumferential direction of the ply piece, is larger than the distance (Pc) between the carcass cords in a central portion of the ply piece.

2 Claims, 5 Drawing Sheets

(52) U.S. Cl.
CPC ........ *B29D 30/42* (2013.01); *B29D 2030/423* (2013.01); *B60C 2009/0408* (2013.01); *B60C 2009/0441* (2013.01); *Y10T 152/10855* (2015.01)

(58) Field of Classification Search
CPC ..... B60C 9/06; B60C 9/08; B60C 2009/2035; B60C 2009/2045; Y10T 152/10855; Y10T 156/906; Y10T 156/907; B29D 30/38; B29D 30/42; B29D 30/46; B29D 2030/381; B29D 2030/423
USPC ............ 156/134, 906, 157, 159, 266, 304.1, 156/304.5, 73.4, 117, 907, 133, 123; 152/548, 558–560
See application file for complete search history.

(56) References Cited

U.S. PATENT DOCUMENTS

| | | | |
|---|---|---|---|
| 5,200,009 A | | 4/1993 | Tokita |
| 2003/0051794 A1* | | 3/2003 | Suda .................. 156/906 X |

FOREIGN PATENT DOCUMENTS

| | | | |
|---|---|---|---|
| GB | 2213112 A | | 8/1989 |
| JP | 03-045335 A | | 2/1991 |
| JP | 5-246207 A | | 9/1993 |
| JP | 2001-187510 A | | 7/2001 |
| JP | 2001-294014 A | | 10/2001 |
| JP | 2005153349 A | * | 6/2005 |
| JP | 2006-160236 A | | 6/2006 |

* cited by examiner

PNEUMATIC TIRE WITH RECTANGLE-SHEET-SHAPED CARCASS PLY PIECES

TECHNICAL FIELD

The present invention relates to a pneumatic tire capable of reducing generation of poor appearance.

BACKGROUND ART

Figure 2:
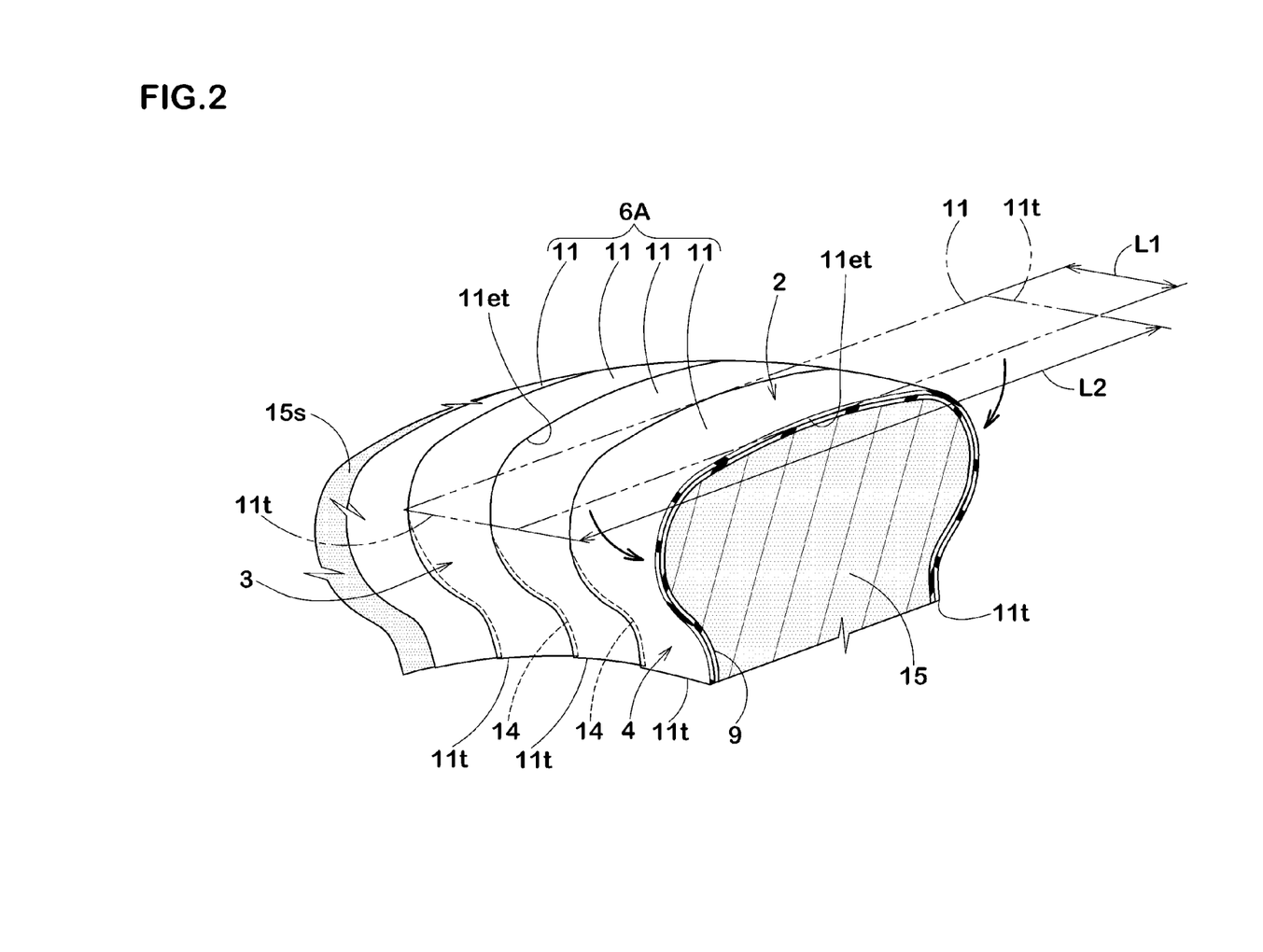
FIG. 2 is a diagrammatic perspective view showing an inner mold of carcass plies.
Figure 5:
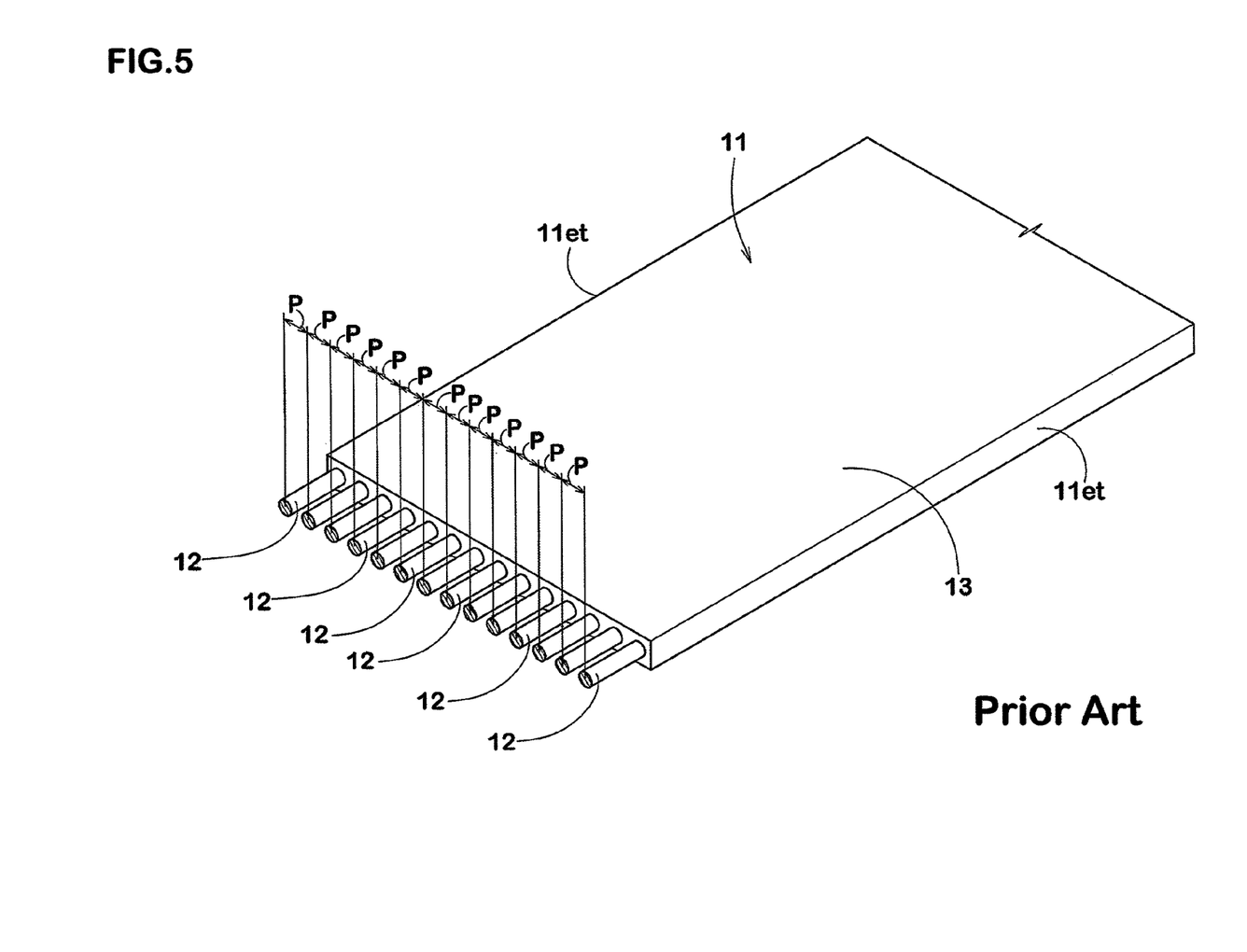
FIG. 5 is a diagrammatic perspective view showing a conventional ply piece.

In FIGS. 2 and 5, there is proposed a method for manufacturing a pneumatic tire to form a toroidal carcass ply 6A by use of an inner mold 15 having rigidity (see the under-mentioned Patent Document 1, for example). In this manufacturing method, the toroidal carcass ply 6A is formed by adhering rectangle-sheet shaped ply pieces 11 on an outer surface 15s of the inner mold 15 via inner liner rubber 9, for example.

Each of the ply pieces 11 has a radial length L2 longer than a circumferential length L1. As shown in FIG. 5, the each of the ply pieces 11 has parallelly-arranged carcass cords 12 along the longitudinal direction. In the circumferential direction, the ply piece 11 has a spacing P of the carcass cords 12 is equal.

Such a method for manufacturing is more capable of reducing circumferential unevenness of the spacing P of carcass cords 12 of the carcass ply 6A than a conventional method for manufacturing where a seat-like carcass ply is toroidally formed by dilation deformation, for example. The method for manufacturing improves therefore uniformity of the tire.

Patent Document 1: Japanese Unexamined Patent Application Publication No. 2006-160236

DISCLOSURE OF INVENTION

Problems to be Resolved by the Invention

As shown in FIG. 2, in the method for manufacturing shown in the above, to absorb the difference between the circumferential lengths on the tread portion 2 side and the bead portion 4 side in the inner mold 15, the ply pieces 11, 11 which were adjacent to each other in the tire circumferential direction from the sidewall portion 3 to the bead portion 4 were overlapped.

In the carcass ply 6A, an overlapped portion 14 of the ply pieces 11, 11, which are adjacent to each other in the tire circumferential direction, therefore an increased cord density of the carcass cord 12 (shown in FIG. 5), and there was a problem of generating a poor appearance such as a dent (dint). Specifically, the poor appearance was liable to be obviously expressed in the sidewall portion 3 having a small rubber volume.

It is therefore, in view of the above-mentioned problems, an object of the present invention is to provide a pneumatic tire capable of reducing the generation of the poor appearance, as a basis for setting a spacing Pe of the carcass cord in at least one of circumferential side edge portions of the ply piece to be larger than a spacing Pc of the carcass cord in a central portion of the ply piece.

Means of Solving the Problems

According to the present invention, a pneumatic tire comprises a carcass formed of at least one carcass ply extending from a tread portion through a sidewall portion to a bead portion. The carcass ply is made by arranging rectangle-sheet-shaped ply pieces having a radial length larger than a circumferential length in the circumferential direction of the tire. Each of the ply pieces has parallelly-arranged carcass cords along the longitudinal direction, and at least partially overlaps with the circumferentially adjacent ply pieces. In each of the ply pieces, the carcass cords in at least one of side edge portions, in the circumferential direction, of the ply piece have a spacing Pe larger than a spacing Pc of the carcass cords in a central portion of the ply piece.

In each of the ply pieces, the spacing Pe of the carcass cords in each of the side edge portions, in the circumferential direction, of the ply piece is larger than the spacing Pc of the carcass cords in the central portion of the ply piece.

A ratio Pe/Pc of the spacings of the carcass cords is in a range of from 1.2 to 2.0.

The spacing Pe of the carcass cords in the side edge portions, in the circumferential direction, of the ply piece is the average value of spacings of three carcass cords arranged on the closest side to the side edge. And the spacing Pc of the carcass cords in the central portion of the ply piece is the average value of spacings of all of the carcass cords from which the spacings of said three carcass cords arranged on the closest side to the side edge are excluded.

The spacings of the carcass cords in the side edge portions gradually decrease from the side edge toward the central portion.

Effect of the Invention

The pneumatic tire of the present invention comprises the carcass formed of at least a single carcass ply extending from the tread portion through the sidewall portion to the bead portion. The carcass ply is made by arranging the rectangle-sheet shaped ply pieces in the circumferential direction of the tire. In each of the ply pieces, a radial length is larger than a circumferential length.

Each of the ply pieces has parallelly-arranged carcass cords along the longitudinal direction. And the ply piece is overlapped on the circumferentially adjacent ply pieces at least partially. Therefore, the carcass ply can absorb the difference between the circumferential lengths on the tread portion side and the bead portion side. The pneumatic tire of the present invention is therefore capable of reducing the generation of a wrinkle of the carcass ply and forming the carcass ply into a toroidal shape.

Moreover, in each of the ply pieces, the carcass cords in at least one of side edge portions, in the circumferential direction, of the ply piece have a spacing Pe larger than a spacing Pc of the carcass cords in a central portion of the ply piece. This can reduce the partial increase of cord density caused by overlap of the ply pieces in the carcass ply. Therefore, the pneumatic tire of the present invention is capable of reducing the generation of the poor appearance such as the dent (dint).

EXPLANATION OF THE REFERENCE

1 Pneumatic tire
6A Carcass ply
11 Ply piece
11e Side edge portion
11c Central portion
12 carcass cord

BEST MODE FOR CARRYING OUT THE INVENTION

Hereinafter, an embodiment of the present invention will be described with reference to the drawings.

Figure 1:
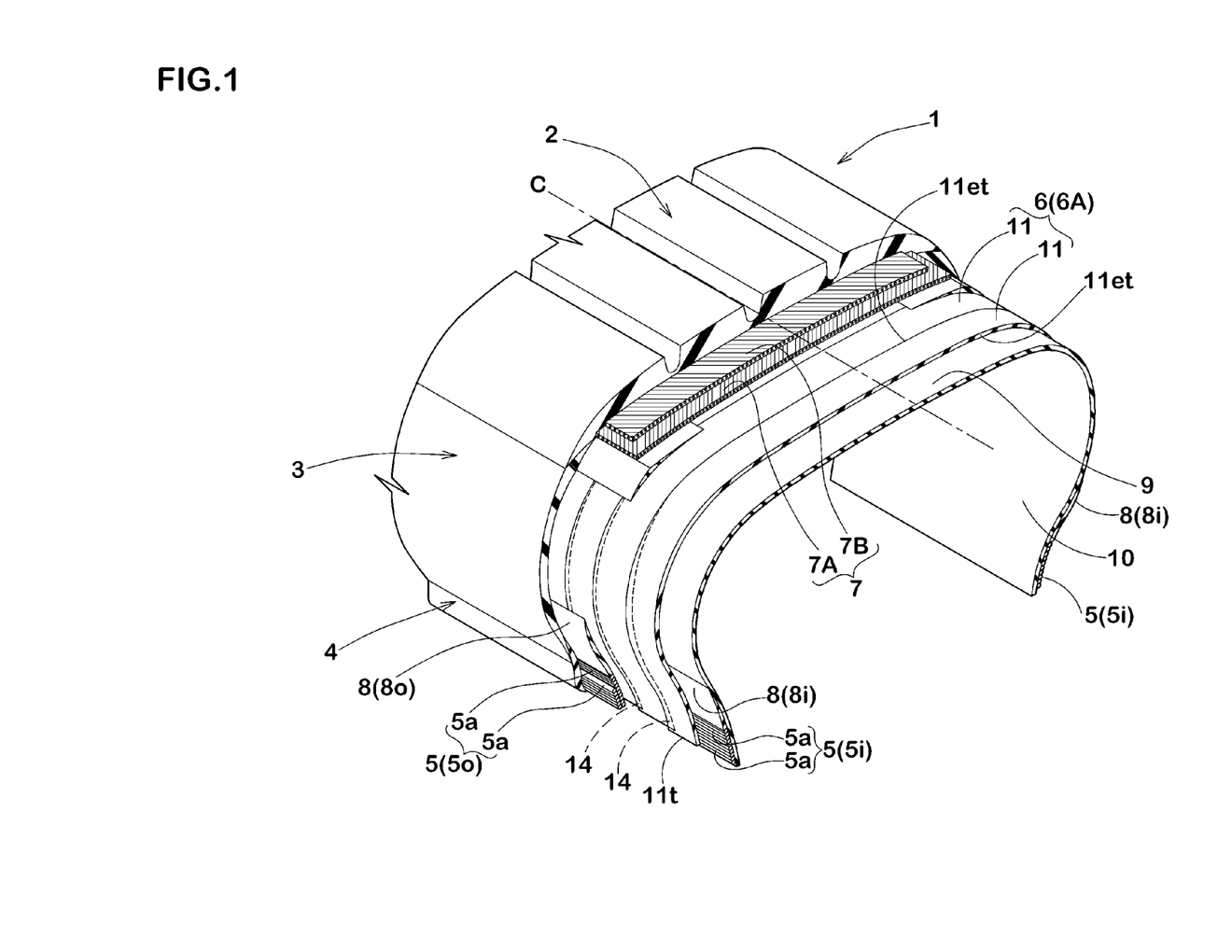
FIG. 1 is a diagrammatic perspective view showing a pneumatic tire forming the present embodiment.

As shown in FIG. 1, the pneumatic tire of this embodiment (hereinafter may be called as "tire") 1 is formed as a tire for passenger car. The tire 1 comprises a carcass 6 extending from a tread portion 2 through a sidewall portion 3 to a bead core 5, a belt layer 7 disposed radially outside of the carcass 6, and an inner liner rubber 9 disposed on radially inside the carcass 6.

The carcass 6 is comprised of at least one carcass ply 6A in the radial structure, one in the present embodiment. The carcass ply 6A extends from the tread portion 2 through the sidewall portion 3 to the bead core 5 of the bead portion 4. Furthermore, the carcass ply 6A terminates at the bead core 5 without being turned up. Such a carcass ply 6A can reduce more employed materials than a conventional carcass ply including a turned-up portion in the bead core 5 (not shown), for example. Therefore, the carcass ply 6A of the present embodiment can reduce mass of the tire and cost of manufacturing.

Furthermore, the carcass ply 6A comprises carcass cords 12 (shown in FIG. 3) arranged at an angle of from 75 to 90 degrees, for example, with respect to the tire equator C. For the carcass cords 12, organic fiber cords and the like are preferably used, for example. The organic fiber cords are preferably nylon, polyester, rayon or the like.

The bead core 5 comprises an inner core 5i disposed on an axially inside of the carcass ply 6A, and an outer core 5o disposed on an axially outside of the carcass ply 6A. These inner core 5i and outer core 5o hold the both radial ends of the carcass ply 6A.

The inner core 5i and the outer core 5o are formed by winding non-expansible bead wire 5a in the circumferential direction of the tire more than once. In the present embodiment, the number of winding of the bead wire 5a of the outer core 5o is set to be larger than the number of winding of the bead wire 5a of the inner core 5i.

Therefore, the bead core 5 can improve bending rigidity of the bead portion 4 while reducing the total number of winding of the bead wire 5a. To realize efficiently this effect, the number of winding of the outer core 5o is preferably 1.2 to 2.0 times the number of winding of the inner core 5i.

The bead portion 4 comprises a bead apex rubber 8 rising in a tapered manner from the inner core 5i and the outer core 5o. The bead apex rubber 8 comprises an inner apex rubber 8i rising from the inner core 5i, and an outer apex rubber 8o rising from the outer core 5o. The inner apex rubber 8i and the outer apex rubber 8o are made of hard rubber having a rubber hardness of from 65 to 98 degrees, for example.

Those inner apex rubber 8i and outer apex rubber 8o can effectively improve the rigidity of the bead portion 4.

In the present description, the "rubber hardness" means a hardness defined by the type-A durometer hardness measured at a temperature of 23 degrees C. with reference to JIS-K6253.

A belt layer 7 is disposed radially outside of the carcass 6 and inward the tread portion 2. And the belt layer 7 comprises at least two belt plies, two belt plies 7A, 7B overlapped in the radial direction of the tire in the present embodiment, for example.

Each of the belt plies 7A, 7B comprises belt cords arranged at a small angle of 10 to 35 degrees with respect to the tire equator C, for example. The belt plies 7A, 7B are overlapped in the direction that the belt cords intersect one another. And, the belt cords are preferably made of steel cords, aramid, rayon or the like, for example.

The inner liner rubber 9 forms a cavity surface 10 of the tire 1. The inner liner rubber 9 of the present embodiment extends between the bead cores 5, 5 in the toroidal manner and disposed on the cavity surface 10 across-the-board. The inner liner rubber 9 is made of non-breathability rubber such as butyl rubber or halogenated butyl rubber, for example. This inner liner rubber 9 can keep the tire cavity filled with air airproof.

As shown in FIG. 2, the carcass ply 6A of the present embodiment is formed of a rectangle-sheet shaped ply pieces 11 arranged in the circumferential direction of the tire. Each of the ply pieces 11 has a radial length L2 larger than a circumferential length L1.

Figure 3:
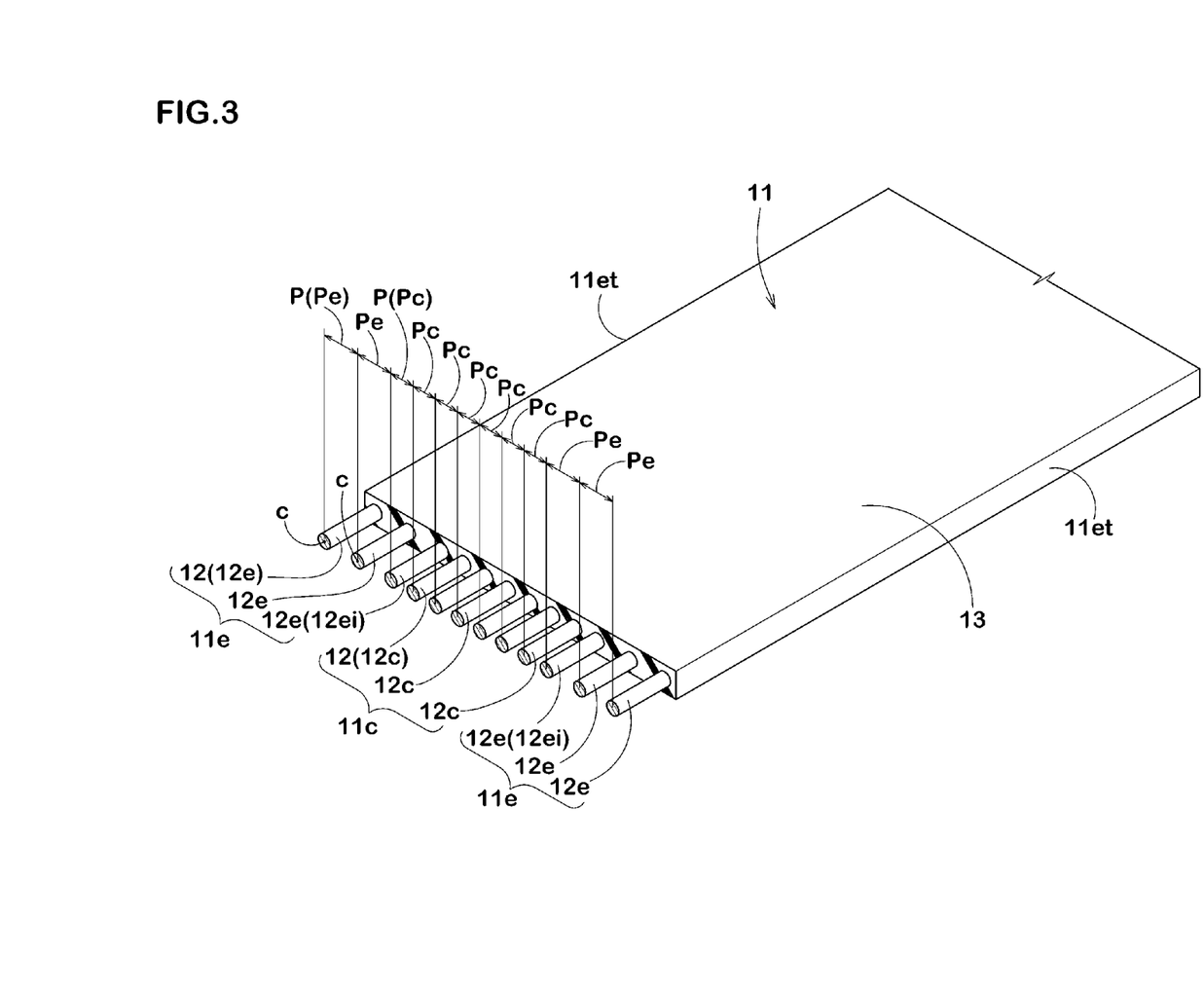
FIG. 3 is a diagrammatic perspective view showing a ply piece.

As shown in FIG. 3, Each of the ply pieces 11 has parallelly-arranged carcass cords 12 along the longitudinal direction, and a topping rubber 13 covering the carcass cords 12. The circumferential length L1 (shown in FIG. 2) of ply piece 11 is in a range of from about 24 to 34 mm. Spacing P of the carcass cords 12 in the circumferential direction is a range of about from 0.8 to 1.8 mm. The spacing P is defined as an interval between the cord centers (c), (c) of the carcass cord 12.

As shown in FIG. 2, in the step of forming an unvulcanized green tire, the ply pieces 11 are adhered on an outer surface 15s of the inner mold 15 having rigidity subsequently in the tire circumferential direction, for example. This forms the toroidal carcass ply 6A on the outer surface 15s. In the present embodiment, between the carcass ply 6A and the inner mold 15, an inner liner rubber 9 is previously disposed.

In the tread portion 2, each of the ply pieces 11 are adhered so as to get its circumferentially-near-most side edge 11et face to face with the side edge 11et of a circumferentially adjacent ply piece 11. Moreover, each of the ply pieces 11 has at least partially overlaps with the circumferentially adjacent ply pieces 11; in the present embodiment, on each of the radially end portions 11t, 11t, the side edges 11et overlap one another. Therefore, the carcass ply 6A comprises an overlapped portion 14 formed by overlapping the ply pieces 11, 11 having a substantially triangle shape in the side view.

The overlapped portion 14 can absorb the circumferential difference between the tread portion 2 side and the tread portion 4 side of the inner mold 15. Therefore, the overlapped portion 14 reduces the development of such a wrinkle in the carcass ply 6A and helps to form the toroidal carcass ply 6A.

In the overlapped portion 14, the carcass cords 12 of the ply pieces 11, 11, which lie circumferentially next to each other, are overlapped, and a cord density of the carcass cord 12 increases partially. Therefore, in a conventional tire, the overlapped portion 14 makes less swelling after vulcanization and is likely to occur a dent (dint) on the tire outer surface. Such a dent prominently occurs in the sidewall portion 3 having a small rubber volume and causes poor appearance.

As shown in FIG. 3, in the present invention, in each of the ply pieces 11, the carcass cords 12 in at least one of side edge portions 11e, in the present embodiment, each of the side edge portions 11e, 11e, in the circumferential direction, of the ply piece 11 have a spacing Pe larger than a spacing Pc of the carcass cords 12 in a central portion 11c of the ply piece 11.

The side edge portion 11e of the ply piece 11 is defined as an area which includes three side edge carcass cords 12e arranged on the circumferentially closest side to the side edge 11et. The spacing Pe in the side edge portion 11e is defined as an average value of spacings P of the three side edge carcass cords 12e. Generally, the carcass cord is formed by twisting at least two cords, and it has a cross-sectional surface formed of combination of at least two circles. Therefore, a spacing of the carcass cords cannot be determined by only the spacing between the two carcass cords, but the spacing Pe is identified through the use of the three side edge carcass cord 12e.

The central portion 11c of the ply piece 11 is defined as an area which includes the central carcass cord 12c located on the circumferentially inner side of three side edge carcass cords 12e. The spacing Pc in the central portion 11c is defined as an average value of spacings P of all of the carcass cords from which the spacings P of the three carcass cords 12e. That is to say, the spacing Pc in the central portion 11c is defined as an average value of the spacings P of the carcass cords 12 including the central carcass cord 12c and the inward side edge carcass cords 12ei, 12ei disposed circumferentially innermost.

Such ply pieces 11 can relatively reduce the cord density of the side edge portion 11e, 11e forming the overlapped portion 14 (shown in FIG. 2) and can inhibit the partial increase of cord density, which more likely to occur in the overlapped portion 14. Therefore, the carcass ply 6A can inhibited the growing of tension caused by the carcass cords 12 in the overlapped portion 14 and can prevent the poor appearance such as the dent of the tire 1.

Moreover, in the present embodiment, the cord density of each of the circumferential side edge portions 11e, 11e is set to small, and the increase of the cord density in the overlapped portion 14 can be effectively inhibited.

To maximize effectively such a function, a ratio Pe/Pc between the spacing Pe in the side edge portion 11e, 11e of the carcass cords 12 and the spacing Pc in the central portion 11 is preferably in a range of from 1.2 to 2.0. When the ratio Pe/Pc is less than 1.2, there is a possibility that the above-mentioned function is insufficiently brought out. When the ratio Pe/Pc is more than 2.0, the cord density of the carcass cord 12 in the overlapped portion 14 is excessively small, and bulge is possibly occur easily. From the standpoint of this, the ratio Pe/Pc is preferably not less than 1.4, more preferably not more than 1.8.

Figure 4:
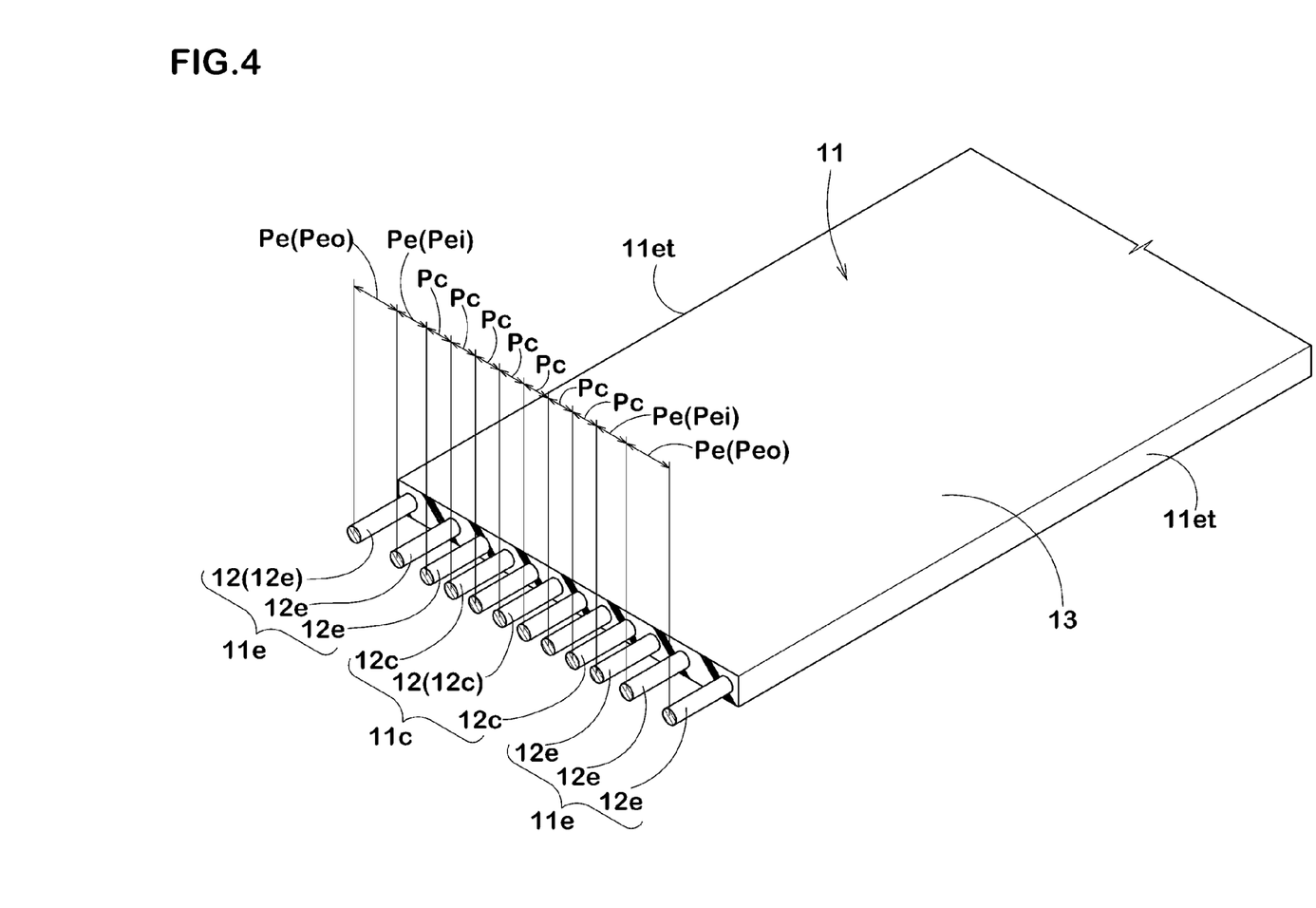
FIG. 4 is a diagrammatic perspective view showing a ply piece of another embodiment.

From the side edge 11et toward the central portion 11c in the side edge portion 11e of the ply piece 11, the percentage of forming the overlapped portion 14 diminishes. Therefore, in the side edge portion 11e (on the central portion 11c side) not comprising overlapped portion 14, the cord density is likely to smaller than in side edge portion 11e (on the side edge 11et side) where the overlapped portion 14 is provided and the central portion 11. Therefore, as shown in FIG. 4, the spacings Pe of the side edge carcass cords 12e of the side edge portion 11e preferably gradually decrease from the side edge 11et toward the central portion 11c. In the present embodiment, among the spacings Pe of the side edge portion 11e, the circumferentially inner spacing Pei is set to be smaller than the circumferentially outer spacing Peo.

In this carcass ply 6A, the cord density of the side edge portion 11e (on the central portion 11c side), where the percentage of forming the overlapped portion 14 is small, can be increased. It helps to prevent much more a circumferential unevenness of the cord density of the carcass cords 12 and to prevent effectively the poor appearance.

Although the especially preferred embodiment of the present invention has been described in detail, the invention is not limited to the above-mentioned concrete embodiments, and various modifications can be made.

Example

A test tire having a basic structure as shown in FIG. 1 and comprising a ply pieces shown in Table 1 was manufactured and tested performances. For comparison, a conventional tire (Comparative Example) comprising a ply pieces having an even spacing (P=1.3 mm) of the carcass cord shown in FIG. 5 was tested in the same way. The common specifications were as follows:

Tire size: 195/65R15
Rim size: 15×6 J
Thickness of sidewall portion: 1.5 mm
Ply piece:
Circumferential length L1: 28 mm
Carcass cord:
Cord material: polyester
Structure of cord: 1670/2 dtex The test method was as follows:
<Appearance of Tire>
The test tire was mounted on the rim, and inflated an internal pressure to 300 kP. Then, visually confirm the presence or absence of poor appearance such as a dent from a sidewall portion to a bead portion. Evaluation was performed in an appearance of the tire and displayed on a score of one to ten. The larger the score, the better appearance is. More than five, the appearance has no problems in the marketplace. The test result is shown in Table 1.

TABLE 1

|  | Com. Ex. | Ex. 1 | Ex. 2 | Ex. 3 | Ex. 4 | Ex. 5 | Ex. 6 |
|---|---|---|---|---|---|---|---|
| Drawing showing ply piece | FIG. 5 | FIG. 3 | FIG. 3 | FIG. 3 | FIG. 3 | FIG. 3 | FIG. 3 |
| Presence/Absence of side edge portion | None | Both sides | Both sides | Both sides | Both sides | Both sides | Single side |
| Distance Pe in side edge portion (mm) | — | 1.36 | 1.46 | 1.86 | 2.20 | 2.35 | 1.86 |
| Distance Pc in central portion (mm) | — | 1.24 | 1.22 | 1.16 | 1.10 | 1.07 | 1.16 |
| Pe/Pc | — | 1.1 | 1.2 | 1.6 | 2.0 | 2.2 | 1.6 |
| Appearance of tire (on a scale of one to ten) [Larger is better.] | 4 | 5 | 6 | 8 | 6 | 5 | 6 |

From the test result, it was confirmed the reduction of occurrence of the poor appearance in the tire of the embodiment.

The invention claimed is:

1. A pneumatic tire comprising a carcass formed of at least one carcass ply extending from a tread portion through a sidewall portion to a bead portion, wherein The at least one carcass ply is made by arranging rectangle-sheet-shaped ply pieces, having a radial length larger than a circumferential length, in the circumferential direction of the tire;

each of the ply pieces has parallelly-arranged carcass cords extending along the longitudinal direction, and at least partially overlapping with the circumferentially adjacent ply pieces;

in each of the ply pieces, the carcass cords, in at least one of side edge portions, in the circumferential direction of the tire, of the ply piece, have a spacing Pe larger than a spacing Pc of the carcass cords in a central portion of the ply piece;

a ratio Pe/Pc of the spacings of the carcass cords is in a range of from 1.40 to 2.0;

the spacing Pe of the carcass cords in said at least one of side edge portions is defined as an average value of spacings of three carcass cords arranged on the closest side to a side edge of said at least one of side edge portions;

the spacing Pc of the carcass cords in the central portion is defined as an average value of spacings of all of the carcass cords from which the spacings of the three carcass cords arranged on the closest side to the side edge of said at least one of side edge portions are excluded;

the spacings of four carcass cords in said at least one of the side edge portions arranged on the closest side to the side edge, gradually decrease from the side edge toward the central portion.

2. The pneumatic tire as set forth in claim 1, wherein, in each of the ply pieces, the spacing Pe of the carcass cords in each of the side edge portions, in the circumferential direction of the tire, of the ply piece, is larger than the spacing Pc of the carcass cords in the central portion of the ply piece.

* * * * *